Feb. 25, 1958   J. BONTEMPI   2,824,773
BEARING FOR SMALL MOTORS
Filed May 7, 1954
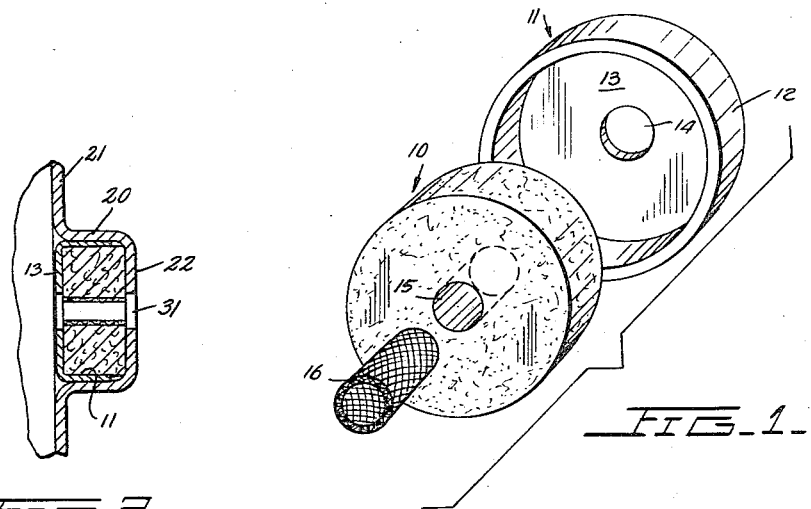
FIG. 1.
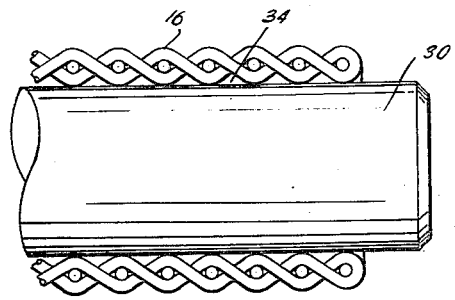
FIG. 2.
FIG. 3.
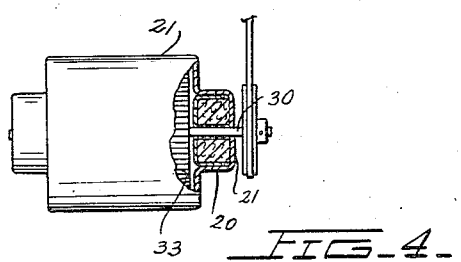
FIG. 4.
INVENTOR.
JOSEPH BONTEMPI
BY
Ostrolenk & Faber.
ATTORNEYS

United States Patent Office 2,824,773
Patented Feb. 25, 1958

2,824,773

BEARING FOR SMALL MOTORS

Joseph Bontempi, Pearl River, N. Y.

Application May 7, 1954, Serial No. 428,268

1 Claim. (Cl. 308—26)

My present invention relates to bearings and more particularly to a bearing adapted for utilization in connection with fractional horsepower motors.

Heretofore in the operation of small motors the construction and conformation of the bearing has been an expensive and complicated matter presenting difficulties in properly lubricating the bearing and in providing appropriate anti-friction surfaces for the shaft of the motor. Attempts have been made to construct miniature ball or roller bearing types of supports, but these have become extremely expensive and even minute dust particles settling in the miniature balls or rollers have interfered with the operation.

The difficulties arising in connection with bearings for miniature motors can be particularly understood in view of the fact that such motor shafts may be of the order of .08" in diameter and less.

My invention contemplates an anti-friction bearing which is self-lubricating and in effect self-forming in that the anti-friction surfaces are shaped, formed and aligned during initial test operations of the motor.

Essentially my invention embraces the concept of placing a felt washer in a cup in the casing and threading the inside hole of the washer with a seamless flexible resiliently woven tubing of fiberglass cut flush with the two parallel surfaces of the washer.

In the initial operation of the motor, the shaft of the motor bearing against the inner surface of the fiberglass woven tubing was polished smooth, and a smooth bearing was formed capable of absorbing shocks and vibrations owing to the felt component but nevertheless capable of relatively frictionless operation.

By way of example, with a motor having a shaft diameter of less than .08", a felt washer of ¼" outer diameter and .08" inner diameter was fitted with a fiberglass woven tubing and squeezed into a cup in the motor housing with the motor shaft riding in the fiberglass tubing.

The bearing was found to be self-aligning, vibration dampening and capable of operation without noticeable increase in heat or energy loss for indefinite periods of time.

The felt positioning element also provided means for applying lubricant should the same be desired or required, the said lubricant being applied by placing a drop of lubricant on the felt, which lubricant was then absorbed by capillary action and directed toward the bearing surface.

The primary object of my invention is the provision of a novel self-aligning, vibration dampening small motor bearing which after an initial period of operation is substantially frictionless.

Heretofore, there has always been clearance between the shaft and the bearing surface to allow for lubrication. For instance, where a shaft running at 4000 R. P. M. and of .125" diameter is inserted in a bearing, then, in order to obtain a running fit, the specified tolerances have been +.0015" to .002" for the opening in the bearing. With my flexible woven resilient fiberglass sleeve, no clearance will be required. In fact, it will accommodate any shaft with relatively large variation in diameter and also maintain a fit so close that, as a practical matter, would be impossible to maintain with a solid sleeve.

The foregoing and many other objects of my invention will become apparent in the following description and drawings in which:

Figure 1 is an expanded view in perspective of my novel bearing.

Figure 2 is a cross-sectional view showing my novel bearing mounted in the motor case.

Figure 3 is an enlarged side view showing the manner in which my novel bearing operates with respect to the motor shaft.

Figure 4 is a side view partly in cross-section showing a complete bearing unit mounted in the motor housing.

Referring to all of the figures, my novel bearing comprises a washer 10 made of felt or cork or other resilient material having an outer diameter initially substantially the same as the inner diameter of the cup 11; the cup 11 has an annular side wall 12 and a base wall 13 having an opening 14 slightly larger in area than the central opening 15 in the washer 10.

A flexible seamless resiliently woven fiberglass sleeve 16 is fitted in the opening 15 in the washer 10, the said sleeve being substantially equal in length to the distance between the opposite parallel surfaces of the washer 10.

The entire assembly mounted in the cup 11 in the manner shown in Figure 2 is fitted into the cup-shaped recess 20 of the motor casing 21 with the exposed surface of the washer 10 bearing against the wall 22 of the cup 20 in motor casing 21 and the wall 13 of cup 11 parallel to wall 22.

Cup 11 is preferably a tight frictional fit in the cup 20 of the motor casing. The motor shaft 30 extends through the fiberglass sleeve 16 and opening 31 of the casing cup 20 which registers with the sleeve 16. The washer 10 secures the fiberglass tubing 16 tight on the shaft 30.

As the motor shaft 30 is operated by the motor 33 in casing 21, the shaft 30 is polished by the ridges of the woven fiberglass sleeve 16 shown in exaggerated form in Figure 3.

This polishing after operation of the order of less than one minute produces extremely smooth bearing surfaces, and the motor may now operate with a minimum of friction, the small recesses 34 between the woven fibers of the fiberglass trapping any foreign matter to maintain the shaft polished and free from any friction increasing factor.

The washer 10 which has been squeezed into the cup 11 provides by reason of its own inherent resiliency self-alignment for the bearing, and the inherent resiliency of the washer further provides for vibration dampening. Such resiliency of the washer, having an extremely slow period of vibration, will inherently dampen any vibrations.

A motor of this type with a bearing of this type may be used for many purposes as, for instance, in the operation of synchros or, for instance, in the operation of small motors used in small phonographs of the type shown in application Serial No. 372,995, filed August 7, 1953.

Where in a particular case it may be necessary to provide some lubricant or where it is desired to provide a small amount of lubricant to be used up during the initial period in which the shaft 30 is polished by its operation in contact with sleeve 16, a drop of lubricant may be placed on the washer 10, thereby being brought by capillary action to the bearing surface.

With my present invention, the free running allowance may be practically nil since the bearing is actually tight around the shaft and the pressure is determined by the diameter of the hole in the resilient material in the washer.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

A bearing comprising a cup, a felt washer placed in said cup and under compression in said cup, central openings in said washer and in said cup in registry with each other, and a flexible sleeve made of resiliently woven fiberglass positioned in the opening in said washer.

References Cited in the file of this patent

UNITED STATES PATENTS

| | | |
|---|---|---|
| 2,230,472 | Sullivan | Feb. 4, 1941 |
| 2,238,197 | Watson | Apr. 15, 1941 |
| 2,270,392 | Talmage et al. | Jan. 20, 1942 |
| 2,283,440 | Hufferd | May 19, 1942 |
| 2,571,235 | Hamer | Oct. 16, 1951 |
| 2,580,438 | Knoblaugh | Jan. 1, 1952 |